United States Patent
Rinderknecht

(10) Patent No.: US 7,390,283 B2
(45) Date of Patent: Jun. 24, 2008

(54) PROCESS FOR CONTROLLING AN AUTOMATED MOTOR VEHICLE DRIVE TRAIN AND DRIVE TRAIN

(75) Inventor: Stephan Rinderknecht, Gomaringen (DE)

(73) Assignee: GETRAG Getriebe-und Zahnradfabrik Hermann Hagenmeyer GmbH & Cie KG, Untergruppenbach (DE)

(*) Notice: Subject to any disclaimer, the term of this patent is extended or adjusted under 35 U.S.C. 154(b) by 0 days.

(21) Appl. No.: 11/598,218

(22) Filed: Nov. 10, 2006

(65) Prior Publication Data
US 2007/0167282 A1    Jul. 19, 2007

Related U.S. Application Data

(63) Continuation of application No. PCT/EP2005/004971, filed on May 7, 2005.

(30) Foreign Application Priority Data
May 14, 2004    (DE) .................. 10 2004 024 840

(51) Int. Cl.
*B60W 10/10* (2006.01)
(52) U.S. Cl. .................. 477/110; 701/62; 701/107
(58) Field of Classification Search ........... 477/107, 477/110; 701/62, 107
See application file for complete search history.

(56) References Cited

U.S. PATENT DOCUMENTS 4,576,062 A * 3/1986 Reppert et al. ............... 477/30
5,322,150 A * 6/1994 Schmidt-Brucken et al. ..... 477/176

FOREIGN PATENT DOCUMENTS

| DE | 197 31 842 A1 | 1/1998 |
|---|---|---|
| DE | 197 40 346 A1 | 3/1999 |
| DE | 101 61 998 A1 | 7/2003 |
| DE | 102 58 873 A1 | 7/2003 |
| DE | 102 11 130 A1 | 9/2003 |
| DE | 102 54 819 A1 | 6/2004 |
| EP | 0 612 643 A1 | 8/1994 |
| EP | 1 004 485 A2 | 5/2000 |
| EP | 1382736 * | 1/2004 |
| EP | 1 388 660 A1 | 2/2004 |
| WO | WO 01/61653 A1 | 8/2001 |

OTHER PUBLICATIONS

Abstract of G. Lechner and H. Naunheimer, "Vehicle Transmissions—Principles, Selection, Design and Construction", Fahrzeuggetriebe—Grundlagen—Auswahl, Auslegung und Konstruktion, 1994, p. 395, Springer-Verlag Berlin Heidelberg, Germany.

* cited by examiner

*Primary Examiner*—Ha D. Ho
(74) *Attorney, Agent, or Firm*—Knobbe, Martens, Olson & Bear LLC

(57) ABSTRACT

A process for controlling an automated motor vehicle drive train which has an engine and a transmission, with the step of at least once detecting at least one wear parameter of the transmission during its running performance, the wear parameter representing the wear or the fatigue of at least one component of the transmission. A load limit parameter, which represents the maximum load on the transmission due to the engine, is set as a function of the detected wear parameter.

18 Claims, 2 Drawing Sheets

| | V/V$_{MAX}$*100 | V1/V$_{MAX}$*100 | V2/V$_{MAX}$*100 | B/B$_N$*100 |
|---|---|---|---|---|
| 1st wheel set 16 | 79% | 80% | 90% | 100% |
| 2nd wheel set 18 | 91% | 80% | 90% | 85% |
| 3rd wheel set 20 | 82% | 80% | 90% | 95% |
| 4th wheel set 22 | 85% | 80% | 90% | 95% |
| Countershaft | 89% | 90% | 95% | 100% |
| Output shaft | 91% | 90% | 95% | 95% |
| 1st bearing | 96% | 90% | 95% | 90% |
| 2nd bearing | 80% | 89% | 94% | 96% |
| Constant wheel set 31 | 89% | 90% | 95% | 90% |

PROCESS FOR CONTROLLING AN AUTOMATED MOTOR VEHICLE DRIVE TRAIN AND DRIVE TRAIN

CROSS-REFERENCE TO RELATED APPLICATIONS

This is a continuation application of International Patent Application PCT/EP2005/004971 filed May 7, 2005 claiming priority of German patent application DE 10 2004 024 840.

BACKGROUND OF THE INVENTION

The invention relates to a process for controlling an automated motor vehicle drive train which has an engine and a transmission, with the step of at least once detecting at least one wear parameter of the transmission during its running performance, the wear parameter representing the wear or fatigue of at least one component of the transmission.

The present invention relates, furthermore, to an automated drive train for a motor vehicle with an engine and with a transmission, with means for detecting at least one wear parameter of the transmission and with means for controlling the drive train.

A process of this type and a drive train of this type are known from WO 01/61653 A1. This publication is concerned with a process for determining the remaining operating duration of a product. In this case, values of specific operating variables are detected. The value range of the individual operating variables is subdivided into classes, and the operating durations are detected as a function of the class within which the detected value falls. An assignment of weighting factors may also take place here, in order to determine a weighted cumulative operating duration for a product.

The product, of which the operating duration up to technical failure is detected, may be, for example, an engine, a transmission or a control apparatus of a motor vehicle.

This process for determining the remaining operating duration is intended to make possible a particularly reliable preventive maintenance/repair shortly before the end of the technical running performance is reached.

The term "running performance" is understood in the present context as being a generic term for various terms which may be connected with the stress of a motor vehicle, such as, for example, operating duration, running distance, running time, etc.

In motor vehicles, an essential quality criterion is that the motor vehicle should as far as possible not break down or as far as possible rarely break down within a predetermined average running performance. A critical criterion for this is reliability, that is to say the probability that a product will not break down during a defined running performance under given functional and ambient conditions (cf. "Fahrzeuggetriebe—Grundlagen, Auswahl, Auslegung und Konstruktion" ["Vehicle transmission—principles, selection, design and construction"] by G. Lechner and H. Naunheimer, Springer-Verlag, page 395).

One of the critical criteria for reliability is what is known as the failure rate $\lambda(t)$ as a measure of the risk of failure of a part when it has already survived up to the distance point (d) or time point (t).

The failure behavior of a product is often exhibited in the form of what is known as a "bathtub curve". This is formed by three regions. The first region refers to early failures which occur essentially due to assembly or manufacturing errors. A middle region with a relatively low failure rate is the region of random failures caused, for example, by operating faults, dirt or the like.

The third region, in which the failure rate rises sharply with an increase in running performance, is the region of wear or fatigue failures.

The second region can be influenced to only relatively little extent. The first region can be influenced positively by strict manufacturing and quality assurance. In the present context, however, the third region is of particular importance.

This is because a suitable running performance calculation can ensure, in the design of the transmission, that, taking into account all possible circumstances, operation which is as damage-free as possible is achieved beyond the required average running performance expectation.

The emphasis in this case is on freedom from damage or maximum reliability over a defined running performance, for example zero failures within the first 150 000 km.

Since the transmission as a whole fails even in the event of the failure of one part of the transmission (for example, the break of a gearwheel), the individual components of the transmission are in each case to be designed as a function of the load to be expected, such that they all fulfill the average running performance expectation.

The different utilization behavior of consumers is of highly critical importance in this running performance calculation. Thus, as is known, there are vehicle drivers who drive extremely defensively and in this case almost never fully exhaust the performance capacity of their vehicle. On the other hand, there are drivers who constantly demand the available performance from their vehicle. However, performance-preoccupied drivers make up, overall, only a relatively small fraction of users. Nevertheless, as a rule, a transmission is designed such that it possesses a high running performance expectation even for performance-preoccupied drivers.

A simplified illustration of this is assumed below, whereby a transmission possesses an average running performance expectation of 100 000 km, that is to say, on average, does not fail before reaching this driving performance with the vehicle in which the transmission is installed. It will be appreciated, however, that, in practice, the average running performance expectation may even amount, for example, to 150 000 or 200 000 km.

It is apparent from what was said above that, where performance-preoccupied drivers are concerned, the average running performance expectation is about 100 000 km. As regards defensive drivers, however, the transmission will have an average running performance expectation which is markedly higher and may lie, for example, in the region of 300 000 or 400 000 km.

The result of this is that, in the case of defensive drivers, a vehicle which possesses, overall, as a system a running performance of, for example, 100 000 kilometers and fails on account of other components is scrapped, even though the transmission would still be "good" for a further running performance of 200 000 or 100 000 km.

Under these circumstances, designing the transmission in such a way that even performance-preoccupied drivers have a reasonable average running performance expectation leads to the individual transmission parts having a stronger or a larger dimensioning. This contributes to a higher weight of the transmission. In other words, the result of this necessary transmission design is that a large proportion of users (defensive drivers) "drag around" with them an unnecessarily high weight above the average running performance of the vehicle.

This leads, in the case of these drivers, to increased fuel consumption and therefore also to higher emissions (in internal combustion engines), etc.

To monitor the functioning of a motor vehicle transmission, it is known from DE 197 31 842 A1 to detect the position of a variable-position transmission element and to check by means of an assessment criterion whether the variable-position transmission element is in a predetermined target position. As a result, a malfunction due to tolerances can be avoided and the running performance can be prolonged.

It is known from the initially mentioned WO 01/61653 A1 to determine the remaining operating duration by means of a running performance estimation, in order to make possible preventively a maintenance/repair before the end of the technical operating duration, that is to say before a failure, is reached.

In general, it is also known to monitor specific parameters, such as, for example, the running time of a vehicle and its load, in order to allow a user-dependent and time-dependent early damage detection (DE 101 61 998 A1).

Thus, for example, it is known to carry out the maintenance intervals of vehicles variably as a function of the load on individual parameters of a vehicle, instead of fixed maintenance intervals of, for example, ten or fifteen thousand kilometers.

BRIEF SUMMARY OF THE INVENTION

The object of the present invention is, therefore, to specify a process for controlling an automated motor vehicle drive train and such a drive train itself, in which a high average running performance, along with a low transmission weight, can be achieved.

In the initially mentioned control process, this object is achieved in that a load limit parameter, which represents the maximum load on the transmission due to the engine, is set as a function of the detected wear parameter.

In the initially mentioned automated drive train, this object is achieved in that the control means carry out the process according to the invention.

The object is thereby achieved in full.

This is because, by virtue of the measure of setting a load limit parameter, the maximum load on the transmission can be set as a function of the detected wear parameter.

In other words, the load recording of the transmission can be set as a function of the wear parameter. If the wear parameter indicates a high wear or a high fatigue of the component of the transmission, the maximum load on the transmission is reduced, in order thereby in future to "protect" or load to a lesser extent the component of the transmission.

This makes it possible to design the transmission or at least a component of this such that the average running performance expectation is reached only in the case of an average load on the transmission, to mention one example. The design may, of course, also be such that the average running performance expectation (for example, the initially mentioned 100 000 kilometers) is reached when the transmission is subjected to above-average, but not maximum load.

In this design, where a defensive driver is concerned, the wear parameter will presumably remain at a value such that the maximum load on the transmission is not restricted. As regards a performance-preoccupied driver who subjects the transmission to well above average load during the running performance, by contrast, the wear parameter may assume a value such that the maximum load on the transmission (set by means of the load limit parameter) is reduced at a suitable time point. The result of this is then that the power consumption of the transmission is restricted for this driver. This may take place, as a rule, by the setting of a limitation in the power output of the engine and also has the further positive effect that, where appropriate, the engine, too, is protected. Theoretically, however, it is even conceivable to limit the power consumption by other measures, for example by opening or partially opening an isolating clutch inserted between the engine and the transmission.

What can consequently be achieved as a result of this is that a transmission subjected to high stress up to this time point is then positively limited in terms of power consumption, in order to reduce the future load. The selection of the time point and the degree of reduction in the maximum load are preferably selected such that the average running performance expectation is fulfilled by means of the transmission in the case of any kind of driver. In an extreme situation, the average running performance expectation can be "readjusted" with point accuracy to a specific running performance by means of the process according to the invention.

It is particularly preferred if the wear parameter of the transmission is detected repeatedly, in particular continuously, during its running performance, and the load limit parameter is repeatedly set anew as a function of this.

In the case of such a repeated, in particular continuous detection and setting of the relevant parameters, as already mentioned above, the running performance expectation of the transmission can be set relatively exactly in the manner of a closed loop, with the aim of achieving an intrinsically safe, damage-free operation of the vehicle, even without inspection intervals being carried out.

For example, the average running performance expectation may be set to a specific value which corresponds to an average stress caused by a driver.

In so far as the transmission or a part of this is subjected to above average stress from the outset, beyond a specific time point or immediately from the commencement onward, the maximum load on the transmission, that is to say the load limit, is reduced as it were "preventively". Insofar as the stress on the transmission or on the transmission part continues to be above-average, the load limit is lowered increasingly, so that even a performance-preoccupied driver ultimately has no markedly higher failure rate up to the average running performance expectation than a defensive driver.

Where a defensive driver is concerned, the load limit would presumably not be reduced at all over the running performance.

For the performance-preoccupied driver, this, of course, means a reduction in the available power either in steps or continuously. This may initially be so slight that a driver does not notice this. In an extreme situation, however, the load limit may also be reduced to an extent such that this becomes clearly detectable or a corresponding signaling to the driver takes place.

According to a particularly preferred embodiment, the wear parameter is stored in a motor vehicle control apparatus. In this case, the wear parameter is a parameter which is preferably updated constantly.

According to a further preferred embodiment, the load limit parameter is set automatically by a motor vehicle control apparatus.

Although it is theoretically also conceivable that the load limit parameter is set "by hand" by programming in a workshop or the like within the framework of regular maintenances, it is nevertheless preferable if the load limit parameter is set automatically during the running performance by the motor vehicle control apparatus as a function of the wear parameter.

According to a further embodiment, preferred overall, the transmission is a change transmission with a plurality of gear steps, a separate wear parameter being detected for at least some of the gear steps.

By virtue of this measure, the group of wear parameters for the individual gear steps can more accurately reflect the load on the transmission.

Whereas only a general or average stress on the transmission can be illustrated when only a single wear parameter, of the entire transmission for example, is detected, the following is possible in the preferred embodiment. For example, it is possible to detect when a driver subjects a specific gear step to particularly high stress, that is to say, for example, constantly drives in the second gear step in town traffic. In this case, the wear parameter for the second gear step represents a higher stress than the wear parameter for the third gear step. Conversely, in the case of drivers who mainly drive on the highway, it may be that the wear parameter for the highest gear step already reflects a relatively high stress, while the wear parameters for the lower gear steps indicate only a low stress. Owing to this differentiated illustration of the transmission wear, an optimized limitation of the maximum load on the transmission can be set.

It is especially preferred, in particular, if the transmission has at least one gearwheel and if a separate wear parameter is detected for the gearwheel.

In this embodiment, the load limit can be fixed as a function of the wear parameter of an individual gearwheel.

In this case, it is particularly preferred if the wear parameter for a gear step or for the gearwheel is a value proportional to the number of rollovers during the running performance of the transmission.

In this case, the wear parameter is not made dependent on how high the driving performance of the vehicle is, but on the extent to which the respective gearwheel has actually been subjected to stress.

It is particularly preferred if the wear parameter for a gear step of the gearwheel is proportional to the number of rollovers during the running performance of the transmission and proportional to the torque transmitted in each case via the gear step or the gearwheel.

Thus, for the wear parameter, it is not only taken into account how many rollovers the wheel set or the gearwheel has executed, but also how much torque it has transmitted in this case.

In the simplest instance, an average torque transmitted in each case by the gearwheel is assumed to be a constant torque. For example, in a gearwheel for a specific wheel set, a fixed value, which is characteristic of this gear step, is assumed as the transmitted torque. Since, however, in a motor vehicle control apparatus, the torque transmitted in each case is, as a rule, known, (for example, from the position of the throttle valve or the like), the transmitted torque may also be integrated. To mention an example, during a trip in a specific gear step, the number of rollovers could be detected, which depends on the speed of the vehicle, and, at the same time, the torque transmitted in each case could be detected, which depends on the engine torque and on the engine acceleration (the engine acceleration is in this case the time-dependent change in the engine rotational speed). These two variables, (that is to say, rollovers and torque) can then be multiplied and integrated in order to determine the wear parameter.

Consequently, this embodiment takes into account how high is the load to which the respective gearwheel is actually subjected.

Furthermore, it is advantageous if the transmission has at least one shaft, and if a separate wear parameter is detected for the shaft.

In this case, a further important component of the transmission may be monitored in terms of wear or in terms of the load accumulated over the running performance of the vehicle. If appropriate, the load limit is reduced such that the shaft is subjected to less load.

In this case, it is advantageous, furthermore if the transmission has at least one rotary bearing, in particular rolling bearing, and if a separate wear parameter is detected for the rotary bearing.

Consequently, in this embodiment, the wear or the load of a rotary bearing can also be detected.

Preferably, in this case, the wear parameter for the shaft and/or for the rotary bearing is proportional to the number of revolutions of the shaft or of the rotary bearing.

Overall it is likewise advantageous if the transmission is a change transmission with a plurality of gear steps, and if the load limit parameter is set separately for at least some of the gear steps.

This is advantageous particularly when a separate wear parameter is also detected for each of the gear steps.

In this case, to be precise, the load limit of the transmission can be fixed individually for each gear step. If, for example, a driver subjects a specific gear step to particularly high stress, it may be that the load limit is lowered before the average running performance expectation is reached, specifically with respect to this special gear step only. In all the other gear steps, the maximum load limit could be set, as before.

In this case, it must be remembered that, in a front transverse transmission, the gearwheels of the constant step-up and the gearwheels of a final drive constantly have to transmit power, independently of the selected gear.

Overall, it is advantageous if the load limit parameter is a value proportional to the maximum torque transmitted from the engine to the transmission.

The torque is particularly important for the load on gearwheels, since, with a rising load, fatigue phenomena may arise on a gearwheel or pitting or the like may take place.

According to a further preferred embodiment, the load limit parameter is a value proportional to the maximum rotational speed transmitted from the engine to the transmission.

The rotational speed is, particularly for shafts and rotary bearings, a parameter which characterizes the respective load. Consequently, when the wear parameter for a shaft or a rotary bearing reaches a specific value, the maximum input rotational speed of the transmission can be limited such that the relevant shaft or the relevant rotary bearing is no longer in future subjected to such high load.

Furthermore, it is advantageous if the load limit parameter is a value proportional to the maximum rotational acceleration transmitted from the engine to the transmission.

In this embodiment, therefore, the rotational acceleration, that is to say the first derivative of the rotational speed, is also incorporated into the determination of the load limit parameter. In a further version, this may, or course, also apply to the second derivative of the rotational speed.

In automated transmissions, as a rule, the sensors required in each case for detecting the wear parameter are present in any case. Thus, as a rule, the motor vehicle control apparatus for controlling the drive train contains information as to which gear step is precisely in engagement. Furthermore, there is information on the torque transmitted in each case, for example via the position of a throttle valve or the like. As a rule, the rotational speed of the engine is also a constantly detected measurement value.

The wear parameter can then be constantly detected in the control apparatus of the drive train within the framework of a specific software routine, in that the relevant values are measured and suitably processed in order to determine the respective wear parameters for wheel sets, gearwheels, shafts and/or rotary bearings.

Thus, to implement the process according to the invention, it is necessary merely to have some computing capacity in the control apparatus and storage space for the wear parameter or wear parameters and for the associated load limit parameter or load limit parameters. As a rule, specific separate hardware does not have to be provided.

This applies, in any case, when the process according to the invention is also to be transferred to manual-shift transmissions. In such transmissions, as a rule, there is no information as to which gear has just been selected. This could then be detected by means of additional suitable sensor means.

It would be appreciated that the features mentioned above and those yet to be explained below can be used not only in the combination specified in each case, but also in other combinations or alone, without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
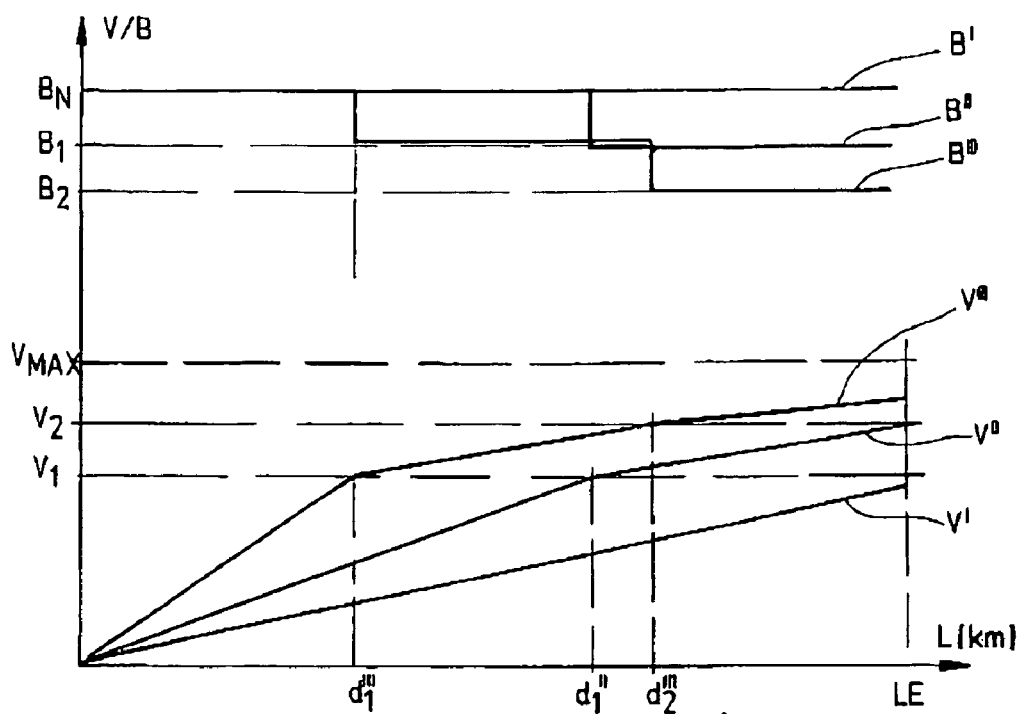
FIG. 1 shows an illustration of the wear parameter and of the load limit parameter for a transmission or a transmission component as a function of the running performance in order to illustrate a first embodiment of the process according to the invention.

FIG. 1 is a graph of a wear parameter V and of a load limit parameter B of a component of a transmission against the running performance L in kilometers.

In the present context, the running performance L is equivalent to the useful life or the kilometerage of the vehicle in which the transmission is installed.

FIG. 1 illustrates an average running performance expectation LE. This may amount, for example, to 100 000 kilometers, referring back to the example mentioned initially. However, the running performance expectation LE may also amount, for example, to 200 000 kilometers. It depends essentially on the average running performance expectation for which the vehicle in which the transmission is installed is designed.

The wear parameter V and the load limit parameter B may relate to a part of a transmission, for example to a wheel set, to an individual gearwheel, to a shaft or to a rotary bearing of the transmission. However, the parameters may also relate to the overall transmission. This may take place, for example, by the computational amalgamation of the individual wear parameters of the relevant components of the transmission. Alternatively, the wear parameter of the transmission may also be geared simply to the transmission component which is the most susceptible to wear.

The maximum load limit parameter is illustrated at $B_N$. The maximum load limit parameter $B_N$ is selected such that the transmission may be subjected to maximum load in accordance with the specification or data sheet of the transmission upon vehicle delivery.

The load on the transmission may be, for example, a value proportional to the maximum input torque of the transmission. The load limit parameter may at the same time or alternatively to this also be a value proportional to the maximum input rotational speed of the transmission. The rotational acceleration may also be incorporated into the load limit parameter insofar as this is desired.

FIG. 1 shows, furthermore, that the load limit parameter can be reduced in two steps to a value $B_1$, which is lower than $B_N$, and to a value $B_2$, which is lower than $B_1$.

Furthermore, FIG. 1 shows a maximum wear parameter $V_{max}$. The maximum wear parameter $V_{max}$ is a value of the wear parameter V which should be at a maximum when the average running performance expectation LE is reached.

In other words, should the component have the maximum wear parameter $V_{max}$ before the average running performance expectation LE is reached, the probability of a failure of the transmission is increased. This may lead to a failure of the transmission, solely on the basis of wear or fatigue phenomena before the average running performance expectation is reached.

The wear parameter V is a parameter which, in the present embodiment of the process according to the invention, is detected continuously during the running performance L.

In the case of a wheel set as a transmission component, the wear parameter V may be represented, for example, as a value proportional to the number of rollovers of one of the gearwheels of the wheel set. Furthermore, the wear parameter V may be a value proportional to the torque transmitted in each case via the gearwheel. In the present embodiment, the wear parameter is determined by the integration of the torque transmitted over the running performance. The wear parameter consequently includes the number of rollovers and the torque transmitted in each case during this time.

Insofar as the transmission component is a shaft of the transmission, the wear parameter may be calculated, for example, on the basis of the number of revolutions. The same applies when the transmission component is a rotary bearing. In this case, the number of revolutions is integrated over the running performance of the transmission.

In the present embodiment of the process according to the invention, two threshold values $V_1$ and $V_2$ of the wear parameter are provided. The threshold value $V_2$ is lower than the maximum wear parameter $V_{max}$. The second threshold value $V_1$ is lower than the first threshold value $V_2$.

FIG. 1 illustrates the wear parameter V' of a component of a transmission installed in a vehicle which is driven by a highly defensive driver. It can be seen that the wear parameter V' does not reach the threshold value $V_1$ until the average running performance expectation LE is reached. Consequently, the assigned load limit parameter B' remains at the maximum value $B_N$ for the entire running performance L until the average running performance expectation LE is reached. The defensive driver could therefore still subject the transmission to a maximum load according to the original specifications even shortly before LE.

Furthermore, FIG. 1 shows a wear parameter V" which is assigned to a component of a transmission installed in a vehicle which is operated by a driver who subjects the vehicle overall to greater load (in the present case, for the sake of simplicity, this will be designated by the designation "more performance-preoccupied driving style"). On account of the more performance-preoccupied driving style of the driver, the transmission component experiences more rapid wear, this being shown in a higher gradient of the wear parameter curve V'''. The wear parameter V''' consequently reaches the threshold value $V_1$ even in the case of a running performance $d_1$ 41 which may amount, for example, to about half the average running performance expectation LE. Since the threshold value $V_1$ is reached, the load limit parameter B''' is reduced at $d_1$''' to the value $B_1$. Consequently, beyond $d_1$''', the transmission or the transmission component can no longer be subjected to such high load. This is reflected in that the wear parameter V''' no longer rises so sharply beyond $d_1$'''. The result of this is that the wear parameter V''' has not yet reached the threshold value $V_2$ when the average running performance expectation LE is reached. The load limit parameter B''' therefore remains at the value $B_1$, up to LE.

The wear parameter of a highly performance-preoccupied driver is shown at V''''. The wear parameter V'''' consequently runs even more steeply from the start. The threshold value $V_1$ is already reached at $d_1$'''', this being a value which, in the present case, amounts to about one third to one quarter of the running performance expectation LE. Consequently, the assigned load limit parameter B'''' is reduced to $B_1$ at $d_1$''''. The transmission component is therefore subjected to a lower load than at the outset, this being shown in a lower gradient of the wear parameter curve. However, the wear parameter V'''' already reaches the further threshold value $V_2$ at $d_2$'''', that is to say before LE. The result of this is that the load limit parameter B'''' is reduced from $B_1$ to $B_2$ at $d_2$''''. This leads to the maximum permissible load on the transmission component being reduced even further. Consequently, the wear of this component no longer increases so sharply beyond $d_2$'''', this being shown in an even lower gradient of the wear parameter curve V''''. By the load limit parameter being lowered to $B_2$ once again, therefore, the maximum wear parameter $V_{max}$ is not reached over the entire running performance when the average running performance expectation LE is reached, in spite of a maximum performance requirement demanded by the driver.

A regulation of the running performance expectation is consequently implemented by means of the process according to the invention. Even when the transmission component is subjected from the start to above-average load (as at V''''), what can be achieved by limiting the maximum load on the transmission component is that the average running performance expectation LE is nevertheless reached. Consequently, in the further course of the running performance, the driver can no longer subject the transmission component to load according to the maximum original specification. This may be reflected in that the full torque of the engine is not made available to him in spite of a maximum performance requirement (for example, fully pressed-down accelerator pedal). The maximum input torque can thus be reduced by means of the load limit parameter. Alternatively or additionally, the maximum rotational speed may also be limited.

In the embodiment of the process according to the invention, as shown in FIG. 1, two threshold values $V_1$, $V_2$ and, correspondingly, two steps of load limit parameters $B_1$, $B_2$ are provided for the wear parameter. It would be appreciated, however, that, instead, even only one threshold value $V_1$ may be provided. Alternatively, even more than two threshold values of the wear parameter may be provided, in the case of a corresponding increase in the number of steps in the reduction of the load limit parameter B.

Furthermore, continuous regulation according to the following systematology may also be envisaged. In this case, it is assumed that an average driver (or, in an extreme situation, even a particularly defensive driver) has reached the maximum wear parameter $V_{max}$ when the average running performance expectation LE is reached. This may take place by appropriate dimensioning in the design of the transmission part.

As regards all drivers who subject the transmission part to higher load, the wear parameter will rise more sharply at the outset. What can then be achieved by regulating the load limit parameter is that even a potentially performance-preoccupied driver reaches exactly the value $V_{max}$ when the average running performance expectation LE is reached. This type of process according to the invention leads to the transmission or transmission part being fully "utilized" in terms of design when the average running performance expectation is reached. It would be appreciated that, in this type of process, it is assumed that the transmission part or the transmission as a whole is exchanged when the average running performance expectation LE is reached, since the probability of a failure would then rise highly super-proportionally.

In FIG. 1, the wear parameter is in each case illustrated diagrammatically as a linear function. It would be appreciated that, in practice, the wear parameter will grow in stages, to be precise whenever a specific gearwheel or a specific wheel set is selected for a specific gear step and is consequently subjected to stress. By contrast, in phases in which this gear step is not selected, there is no or essentially no stress, so that the wear parameter remains essentially constant.

It will be appreciated from the overall context, however, that the wear parameter is a value which rises with the running performance of the motor vehicle.

Moreover, as regards the wear parameter for wheel sets/gearwheels, a distinction may be made between a wear parameter for traction operation and a wear parameter for overrun operation. In this case, the torque transmitted in each case in traction operation would be determined, for example, by means of the position of a throttle valve of the engine of the motor vehicle or by means of a comparable signal.

In overrun operation, in which the teeth of the gearwheels of the wheel set are subjected to stress in exactly the other direction, the overrun torque could be detected, for example, via other algorithms known per se.

It is assumed below, however, for the sake of simplicity, that, for gearwheels, only the wear parameter illustrating the traction stress is used for the process according to the invention.

Figure 2:
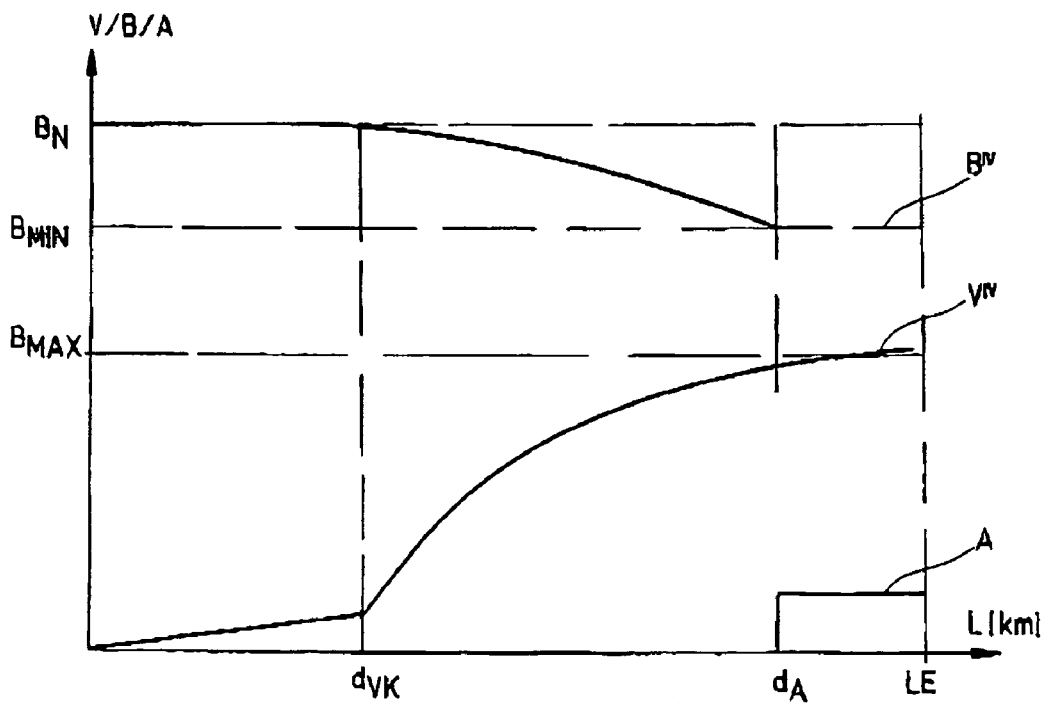
FIG. 2 shows an illustration, comparable to FIG. 1, of a further embodiment of the process according to the invention.

FIG. 2 shows a graph comparable to FIG. 1 and illustrates a continuous regulation of a load limit parameter $B^{IV}$ on the basis of a wear parameter $V^{IV}$ according to an alternative embodiment of the process according to the invention. It can in this case be seen from the curve of the wear parameter $V^{IV}$ that the transmission part is subjected to relatively low loads at the outset (for example, by a defensive driver). However, at a time point $d_{VK}$ the vehicle is sold. From this time point on, the vehicle is driven by a more performance-preoccupied driver, so that the gradient of the wear parameter curve rises. Consequently, beyond $d_{VK}$, the load limit parameter $B^{IV}$ is also lowered gradually. The load caused by the driver is nevertheless so high, however, that the load limit parameter $B^{IV}$ reaches a minimum value $B_{min}$ before the average running performance expectation LE is reached. The value of $B_{min}$ represents a state in which the load on the transmission is limited to the extent that a reasonable operation of the motor vehicle is still just possible. However, the result of a further reduction in the load limit would be that the vehicle could no longer be moved adequately.

The load limit parameter $B^{IV}$ therefore remains at the value $B_{min}$ beyond running performance $d_A$.

In order, however, to make it clear to the driver that he has already subjected the transmission to such high a load that a specific limit ($B_{min}$) is reached and that, if the high load is pursued, he must consequently reckon on the transmission failing prematurely, a corresponding alarm signal A is emitted at $d_A$ in order to signal this clearly to the driver.

It would be appreciated that the overall design should be selected such that such a state arises only in the case of drivers who subject the transmission or the transmission part to well above average load. By contrast, where the majority of all drivers are concerned, this minimum load limit parameter $B_{min}$ should never be reached.

In the embodiments of the process according to the invention, as shown in FIG. 1 and 2, it is generally assumed that the wear parameter V can only rise. This, admittedly, corresponds to reality only in so far as wear, as a rule, cannot be cancelled.

However, a situation could arise where a vehicle is subjected to particularly high load at the start of the running performance, so the regulating mechanisms according to the invention intervene at an early stage in order to lower the load limit of the transmission or of the transmission part.

If the vehicle is then sold, for example, to a particularly defensive driver, the wear parameter would only rise highly under-proportionally. In so far as this is monitored by means of a suitable algorithm, the lowering of the load limit parameter could then be cancelled again. This would lead to the defensive driver at least being afforded the possibility again of subjecting the transmission to maximum load (for example, in emergency situations).

Figures 3, 4:
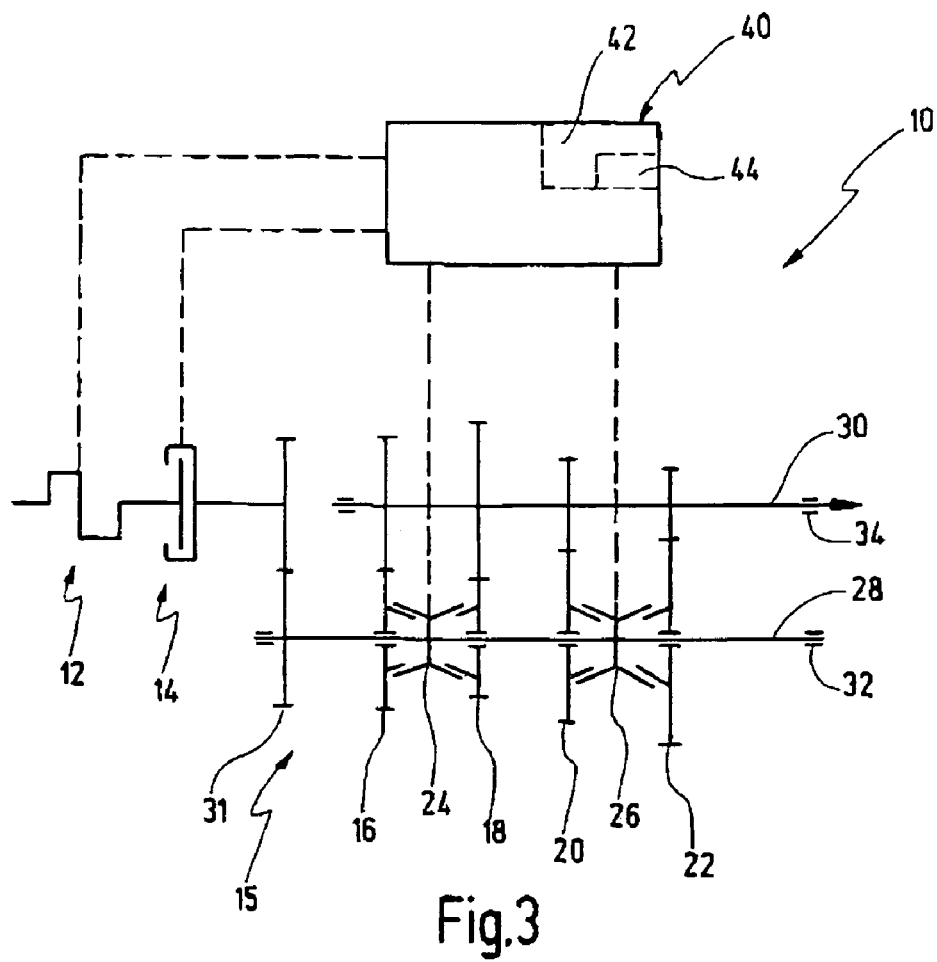
FIG. 3 shows a diagrammatic illustration of a drive train according to the invention.
FIG. 4 shows a diagrammatic illustration of the wear and load limit parameters stored in a control apparatus of the drive train according to the invention.

FIG. 3 shows a diagrammatic illustration of a drive train 10 according to the invention.

The drive train 10 has an internal combustion engine 12, a starting and isolating clutch 14 and an automated shift transmission 15.

The shift transmission 15 is equipped as a spur-wheel transmission with a plurality of wheel sets 16, 18, 20, 22 corresponding to a plurality of gear steps. A first shift sleeve 24 serves for alternately shifting the wheel set 16 or the wheel set 18. A second shift sleeve 26 serves for shifting alternately the wheel set 20 or the wheel set 22.

The automated shift transmission 15 has, furthermore, a countershaft 28 and an output shaft 30 which are connected constantly via a constant wheel set 31. The countershaft 28 is mounted by means of a plurality of rotary bearings (rolling bearings), one of which is shown at 32. The output shaft 30 is mounted by means of a plurality of rotary bearings, one of which is illustrated diagrammatically at 34.

Furthermore, a control apparatus 40 is illustrated in FIG. 3. The control apparatus 40 is connected to the internal combustion engine 12, to the starting and isolating clutch 14 and to the automated shift transmission 15.

The control apparatus 40 may be constructed as a unitary control apparatus. It may, however, also be implemented such that decentral control apparatuses are provided for the internal combustion engine 12, on the one hand, and for the automated shift transmission 15 (and, if appropriate, the isolating clutch 14), on the other hand, and such that an overriding control apparatus is connected to these two decentral control apparatuses.

The control apparatus 40 detects the output rotational speed of the internal combustion engine 12 and the torque output of the internal combustion engine 12. Furthermore, it provides a limit value for each of these two variables.

Further variables of the internal combustion engine 12 may, if appropriate, also be measured or controlled (limited).

The control apparatus 40, furthermore, actuates the shift sleeves 24, 26 for the selection and deselection of gear steps of the shift transmission 15. The control apparatus 40 consequently "knows" the respective state of the shift transmission 15.

A control process taking place within the control apparatus 40 and implementing the process according to the invention is illustrated diagrammatically at 42.

In this case, a wear parameter is separately detected in each case for the transmission parts and an assigned load limit parameter is set. These parameters are contained in a register section 44 of the control apparatus 40.

The register section 44 is illustrated diagrammatically in FIG. 4. FIG. 4 illustrates that the wear parameter of the individual transmission parts already possesses in each case an advanced value, specifically in the range between 79 and 96%. The wear parameter V is in this case given as a percentage value of the maximum wear parameter $V_{max}$.

For example, the wear parameter of the first wheel set 16 has a value of 79%. The further wheel sets 18, 20, 22 have in each case wear parameters of 91%, 82% and 85% respectively. By contrast, the wear parameter of the constant wheel set 31 is higher (for example, 89%).

It can be seen, furthermore, that, in the embodiment of FIG. 1, the process according to the invention is implemented with a first threshold value $V_1$ and with a second threshold value $V_2$. The threshold values $V_1$, $V_2$ are also given as percentage values. For the wheel sets 16 to 22, the threshold value $V_1$ amounts in each case to 80% of the maximum wear parameter. The threshold value $V_2$ amounts to 90% of the maximum wear parameter $V_{max}$.

The first wheel set 16 has a wear parameter of 79% which consequently lies below $V_1$. The assigned load limit parameter B is therefore set at 100%. The load limit parameter B is in each case likewise given as a percentage in FIG. 4 in relation to the maximum load limit parameter $B_N$.

The second wheel set 18 has been subjected to markedly higher load in the transmission. The wear parameter is at 91% and therefore already above $V_2$. The load limit parameter is therefore lowered to 85%.

The third wheel set and the fourth wheel set lie in each case between $V_1$ and $V_2$, so that the load limit parameters in each case amount to 95%.

It will be appreciated that the selection of the threshold values $V_1$, $V_2$ (at 80% and 90% respectively) and the selection of the lowering of the load limit parameter to 95% and 85% respectively are to be understood merely as examples.

The register section 44 of FIG. 4 shows, furthermore, that the shafts 28, 30 and their bearings 32, 34 are also monitored in terms of wear.

In this case, threshold values $V_1$ of 90% and $V_2$ of 95% are set. The steps $B_2$, $B_1$ of the load limit parameter B are set at 95% and 90%.

FIG. 4 illustrates the wear parameters for the first countershaft 28 and the first bearing 32 as separate values. As a rule, however, only one value of the wear parameter will be adopted for each of these two, since the number of revolutions is normally critical for the wear or fatigue of both components. The same applies, of course, to the output shaft 30 and to the assigned bearing 34.

The ratio of the individual transmission components to one another is as follows. In the case of the wheel sets 16 to 22, the load limit parameter can be set in each case individually.

Thus, for example, it may be that the first wheel set 16 may be subjected to 100% load at a specific time point of the running performance, but the second wheel set 18 is subjected to only 85% load, as illustrated in FIG. 4.

Consequently, when the first wheel set is shifted in, the control apparatus 40 can, as before, permit the maximum load at the input of the transmission 15, but limit the load when the second wheel set 18 is shifted in (by limiting the torque and/or the input rotational speed of the transmission 15).

However, the shafts 28, 30 or bearings 32, 34 are generally subjected to load during the transfer of power via the transmission 15, but not independently of the selected gear step. This is because the load on the shafts and bearings also depends, as a rule, on the shifted gear (other introduced forces arise from the loaded wheel sets). The maximum load on the transmission 15 is consequently governed by the transmission component which already has the highest wear, this being the constant wheel set 31 in the case of FIG. 4. The load limit parameter is set there at 90%. This means that the load on the transmission 15 can in general amount to only 90%, independently of the selected gear step.

Although, in the example of FIG. 4, the first wheel set 16 is still capable of being subjected to 100% load, even with the first wheel set 16 shifted the maximum load of the transmission would amount to only 90%, specifically because of the load limit parameter of the constant wheel set 31.

A distinction is therefore to be made between those components of the transmission (shafts/bearings) which transfer power independently of the respective shift state and those components (gearwheels/wheel sets) which transfer power in the shifted state only.

The shafts/bearings are, admittedly, always subjected to load. As mentioned above, however, the gear step selected in each case also has a specific, albeit lower influence on the stress of the shafts/bearings.

In many instances, however, in a simplified embodiment of the present invention, it will even be possible to dispense with a monitoring of the wear of the shafts and of the bearings and only the wear of the wheel sets will be monitored. In this case, of course, the in each case calculated load limit parameter of the respective wheel set would ultimately be responsible for the maximum load of the transmission, since it will then be assumed that the components which are located constantly in the power flux can always be subjected to 100% load.

In general, it is also possible to provide, instead of a wear parameter of the wheel set, a wear parameter of one gearwheel or of both gearwheels of the wheel set.

Furthermore, it is possible also to apply the process according to the invention correspondingly to other types of drive trains, for example automatic transmissions with a hydrodynamic torque converter, to continuously variable transmissions, to torroidal transmissions, to double clutch transmissions, etc.

It would be appreciated that the wear of the starting and isolating clutch can also be monitored correspondingly. This takes place, for example, by means of a wear parameter which is proportional to the integral of the transmitted torque, multiplied by the respective slip, so that the wear is determined computationally. It is also possible, of course, to detect the wear in a starting and isolating clutch by means of a separate wear sensor, that is to say a sensor which detects the lining thickness.

In general, it is, of course, also possible to carry out a similar control or regulating strategy for an internal combustion engine, in which case the wear parameter can be determined, for example, by means of the rotational speed and/or the transmitted torque (by integration, as in the previous embodiments, too).

Finally, it is also possible to combine the wear parameters of the individual elements of the drive train with one another.

Moreover, where gearwheels are concerned, it is possible to distinguish between traction load and overrun load. Thus, for a gearwheel, a wear parameter could be provided for traction loads and a further wear parameter could be provided for overrun loads.

In automated transmissions, the required variables for calculating the wear parameter are, as a rule, present in any case in a control apparatus. As regards a manual shift transmission, for example, additional sensor means would have to be provided, which detects which gear is selected in each case and which torque is transmitted during this time (or at which rotational speed the gear step is in each case operated).

What is claimed is:

1. A process for controlling an automated motor vehicle drive train which has an engine and a transmission, with the step of at least once detecting at least one wear parameter of the transmission during its running performance, the wear parameter representing the wear or the fatigue of at least one component of the transmission,
   wherein a load limit parameter, which represents the maximum load on the transmission due to the engine, is set as a function of the detected wear parameter.

2. The method as claimed in claim 1, wherein the wear parameter of the transmission is detected repeatedly and continuously, during its running performance, and the load limit parameter is repeatedly set anew.

3. The process as claimed in claim 2, wherein the wear parameter is stored in a motor vehicle control apparatus.

4. The process as claimed in claim 1, wherein the load limit parameter is set automatically by a motor vehicle control apparatus.

5. The process as claimed in claim 1, wherein the transmission is a change transmission with a plurality of gear steps, and wherein a separate wear parameter is detected for at least some of the gear steps.

6. The process as claimed in claim 1, wherein the transmission has at least one gearwheel, and wherein a separate wear parameter is detected for the gearwheel.

7. The process as claimed in claim 5, wherein the wear parameter for a gear step or for a gearwheel is a value proportional to the number of rollovers during the running performance of the transmission.

8. The process as claimed in claim 6, wherein the wear parameter for a gear step or for the gearwheel is a value proportional to the number of rollovers during the running performance of the transmission and proportional to the torque transmitted in each case via a wheel set or the gearwheel.

9. The process as claimed in claim 1, wherein the transmission has at least one shaft, and wherein a separate wear parameter is detected for the shaft.

10. The process as claimed in claim 1, wherein the transmission has at least one rotary bearing, and wherein a separate wear parameter is detected for the rotary bearing.

11. The process as claimed in claim 9, wherein the wear parameter for the shaft and a rotary bearing is proportional to the number of revolutions of the shaft or of the rotary bearing.

12. The process as claimed in claim 1, wherein the transmission is a change transmission with a plurality of gear steps, and wherein the load limit parameter is set separately for at least some of the gear steps.

13. The process as claimed in claim 1, wherein the load limit parameter is a value proportional to the maximum torque transmitted from the engine to the transmission.

14. The process as claimed in claim 1, wherein the load limit parameter is a value proportional to the maximum rotational speed transmitted from the engine to the transmission.

15. The process as claimed in claim 1, wherein the load limit parameter is a value proportional to the maximum rotational acceleration transmitted from the engine to the transmission.

16. A process for controlling an automated motor vehicle drive train which has an engine and a transmission, with the step of at least once detecting at least one wear parameter of the transmission during its running performance, the wear parameter representing the wear or the fatigue of at least one component of the transmission, wherein a load limit parameter, which represents the maximum load on the transmission due to the engine, is set as a function of the detected wear parameter, and wherein the transmission is a change transmission with a plurality of gear steps, and wherein a separate wear parameter is detected for at least some of the gear steps.

17. The process as claimed in claim 16, wherein the load limit parameter is set separately for at least some of the gear steps.

18. An automated drive train for a motor vehicle, with an engine, with a transmission, with means for detecting at least one wear parameter of the transmission and with means for controlling the drive train, wherein the control means control the automated motor vehicle drive train and at least once detect at least one wear parameter of the transmission during its running performance, the wear parameter representing the wear or the fatigue of at least one component of the transmission, wherein a load limit parameter, which represents the maximum load on the transmission due to the engine, is set by the control means as a function of the detected wear parameter.

* * * * *